Jan. 15, 1952     C. A. KOZA     2,582,336
ANGLE DRIVE
Filed Sept. 4, 1948
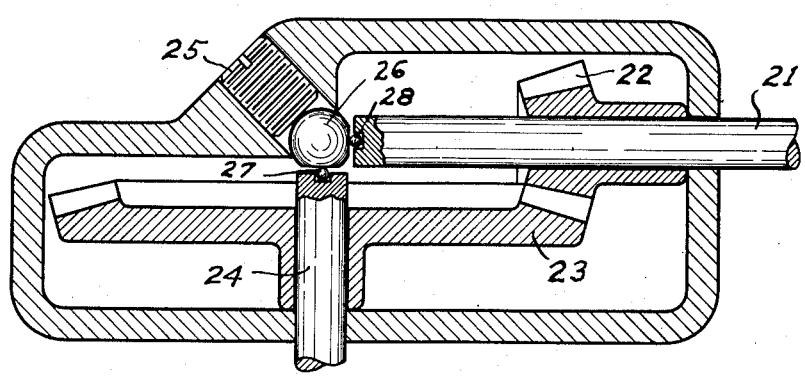
INVENTOR.
CHARLES A. KOZA Patented Jan. 15, 1952

2,582,336

UNITED STATES PATENT OFFICE 2,582,336

ANGLE DRIVE

Charles A. Koza, Pittsburgh, Pa.

Original application April 21, 1948, Serial No. 22,361. Divided and this application September 4, 1948, Serial No. 47,936

4 Claims. (Cl. 74—416)

This invention relates to angle drives and, more particularly, to angle drives which are especially useful in angle drills commonly employed for drilling holes in restricted places at an angle to the driving shaft. The present application is a division of my earlier application Serial Number 22,361, entitled "Angle Drill," filed April 21, 1948, and issued February 22, 1949, as Patent No. 2,462,647.

In my earlier Patent No. 2,229,509, issued January 21, 1941, on "Angle Drill Construction," of which the present application is an improvement, a single ball is provided at the juncture or apices of two meshing bevel gears, which ball is seated in the respective gears, therefore resists end thrust and is adjustable in position angularly to take up for wear of the relatively rotating parts. A disadvantage of such ball is that due to its relatively large size and large area of contact in the bevel gear seats, it does not freely rotate and often remains perfectly stationary, resulting in accelerated wear of the bevel gear seats, causing crowding of the gears together, misalignment, and considerable wearing thereof which shortens the life of the drill.

An object of the present invention is to provide a novel angle drive of the adjustable type which is devoid of the above mentioned disadvantages.

A more specific object of the present invention is to provide a novel angle drive including adjustable end-thrust anti-friction bearing means disposed between the meshing bevel gears and so constructed as to considerably reduce friction and heating of the parts during use and to maintain perfect alignment of the gears irrespective of wear of the parts.

Broadly stated, my invention relates to an angle drive, wherein two bevel or miter gears are in meshing relationship and two small ball bearings are provided, one seated in each face thereof and wherein an end thrust member having angularly disposed flat faces is adjustably positioned at the juncture or apices of the gears in a manner so that the small balls will roll freely on such flat faces of the common end thrust member, thereby permitting taking up for wear and for any tendency to get out of the proper angular alignment.

Other objects and advantages of this invention will become apparent from a study of the following specification taken with the accompanying drawing wherein The single figure is a longitudinal cross-sectional view of a bevel gear drive embodying the principles of my invention.

In accordance with the principles of the present invention, a small anti-friction ball 28 is seated in a suitable pocket formed in the end face of driving shaft 21 and a small anti-friction ball 27 is correspondingly seated in the end face of driven shaft 24. An anti-friction element and thrust element 26 is provided at the juncture of the two bevel gears and may be in the form of a sphere having two flat, angularly disposed faces which are in contact with balls 28 and 27, respectively. These faces are shown as being disposed at an angle of 90°, but in case of a 45° drive, they would be disposed at an angle of 45°, etc. An adjusting screw 25 is screw threaded into a corner of the housing and abuts against member 26 so as to take up for wear. That is, by screwing in the adjusting screw 25, member 26 moves further inwardly causing rolling of balls 27 and 28 on its flat faces and separating the bevel gears, thereby preventing their crowding together, which otherwise would result in excessive wear.

The common adjustable member 26, therefore, serves to take up end thrust of both bevel gears 22 and 23 in one direction (toward the apices thereof).

Inasmuch as only a point of contact is provided between the small balls 27 and 28 and the flat surfaces of member 26, very little friction will be developed, thereby considerably increasing the efficiency of the drive. Furthermore, since the small balls are free to roll on such flat surface, any tendency towards lateral or longitudinal displacement of the driving and driven shafts will be automatically compensated for without the development of excessive friction or wear. Also, since the flat surfaces are at a definite 90° angular relationship, they will tend to keep the faces of the bevel gears in exactly the same angular relationship, even after the parts wear appreciably. It is necessary to make only member 26 and the small balls 27 and 28 of hard material. With such arrangement, therefore, it is unnecessary to make the seats of the driving and driven shafts of hard material as would be required in the construction shown in my aforesaid earlier patent.

Thus it will be seen that driving shaft 21 has rigidly fastened thereto bevel gear 22 which meshes with a driven bevel gear 23 rigidly fastened to driven shaft 24. Adjusting screw 25 will move the common end thrust element 26 so that the flat faces thereof will be urged against small anti-friction balls 27 and 28, respectively, seated in the ends of the respective shafts 24 and 21.

An important feature of my invention is that the angle drive has relatively few parts, which parts are simple and may be removed or replaced with only a pair of pliers and a screw driver.

Thus it will be seen that I have provided a relatively simple and efficient angle drive with an adjustable end thrust element common to both meshing bevel gears and which is of such construction and arranged in such manner as to minimize wear and crowding of the gears and prevent excessive friction otherwise caused from slight misalignment of the respective shafts, also, which drive has solely a point of contact with the common adjustable end thrust element so as to reduce the frictional heat developed and considerably increase the efficiency of the drive, thereby extending the life of the drive over a considerably longer period than that of conventional angle drives.

While my novel adjustable angle drive is shown in a specific angle drive construction, it will be apparent that it is useful in other drives, such as in machinery, that is, in drives wherein the driven member is at an angle with respect to the driving member.

While I have illustrated and described a single specific embodiment of my invention, it will be understood that this is by way of illustration only, and that various changes and modifications may be made within the contemplation of my invention and within the scope of the following claims.

I claim:

1. An angle drive comprising, in combination, a housing, a shaft rotatably mounted in said housing, a second shaft rotatably mounted in said housing at an angle with respect to said first shaft, a bevel gear coaxial with and rigidly secured to each of said shafts so as to mesh with each other within said housing, an anti-friction spherical surface provided on the adjacent faces at the ends of said shafts, an adjusting screw extending through said housing and along a line extending through the points of intersection of the extended axes of said shafts, and an end thrust element having angularly disposed faces held against said spherical surfaces by said adjusting screw.

2. An angle drive as recited in claim 1 wherein said shafts and their respective bevel gears are arranged in right angular relationship and wherein said angularly disposed faces of said end thrust element are correspondingly at right angular relationship.

3. An angle drive as recited in claim 1 wherein said end thrust element is in the form of an anti-friction ball having said angularly disposed faces formed in one hemispherical portion thereof.

4. An angle drive comprising, in combination a housing, a shaft rotatably mounted in said housing, a second shaft rotatably mounted in said housing at an angle with respect to said first shaft, a gear coaxial with and rigidly secured to each of said shafts so as to mesh with each other within said housing, an anti-friction ball seated on each of the adjacent faces at the ends of said shafts, an adjusting screw extending through said housing and through the points of intersection of the extended axes of said shafts, and an end thrust element having angularly disposed faces held against said balls by said adjusting screw.

CHARLES A. KOZA.

REFERENCES CITED

The following references are of record in the file of this patent:

UNITED STATES PATENTS

| Number | Name | Date |
|---|---|---|
| 1,273,275 | Roesen et al. | July 23, 1918 |
| 2,462,647 | Koza | Feb. 22, 1949 |